US010235400B2

(12) United States Patent
Desai et al.

(10) Patent No.: US 10,235,400 B2
(45) Date of Patent: Mar. 19, 2019

(54) DATABASE KEYING WITH ENCODED FILTER ATTRIBUTES

(71) Applicant: Xactly Corporation, San Jose, CA (US)

(72) Inventors: Kandarp Mahadev Desai, Mountain View, CA (US); Gowri Shankar Ravindran, Bangalore (IN)

(73) Assignee: Xactly Corporation, San Jose, CA (US)

( * ) Notice: Subject to any disclaimer, the term of this patent is extended or adjusted under 35 U.S.C. 154(b) by 0 days.

(21) Appl. No.: 14/788,645

(22) Filed: Jun. 30, 2015

(65) Prior Publication Data

US 2016/0335295 A1    Nov. 17, 2016

(30) Foreign Application Priority Data

May 15, 2015   (IN) .............................. 532/KOL/2015

(51) Int. Cl.
*G06F 17/30*      (2006.01)
(52) U.S. Cl.
CPC .............................. *G06F 17/30315* (2013.01)
(58) Field of Classification Search
CPC ......... G06F 17/30315; G06F 17/30336; G06F 17/30495; G06F 17/30
See application file for complete search history.

(56) References Cited

U.S. PATENT DOCUMENTS

| 2007/0226245 | A1* | 9/2007 | Murthy | G06F 17/30492 |
| 2010/0205227 | A1* | 8/2010 | Weissman | G06F 17/30595 |
| | | | | 707/803 |
| 2014/0172775 | A1* | 6/2014 | Niehoff | G06F 17/30289 |
| | | | | 707/600 |
| 2014/0279964 | A1* | 9/2014 | Velury | G06F 17/30153 |
| | | | | 707/693 |

OTHER PUBLICATIONS

George, Lars. HBase: The Definitive Guide. Sabastopol, CA, O'Reilly, 2011, Chapter 4, "Filters" [retrieved on Dec. 24, 2015]. Retrieved from: http://techbus.safaribooksonline.com/print?xmlid=9781449314682%2Fid3592480.*
K. Wu et al., FastBit: iteractively searching massive data, Journal of Physics: Conference Series 180 012053, 2009 [retrieved Jul. 15, 2016]. Retrieved from the Internet: http://iopscience.iop.org/1742-6596/180/1/012053.*

* cited by examiner

*Primary Examiner* — Kristopher Andersen
(74) *Attorney, Agent, or Firm* — Hickman Palermo Becker Bingham LLP (57) ABSTRACT

A data processing method comprising the computer-implemented steps of using a database index key processing module in a computer, generating row keys for a data store, the data store comprising data records, each comprising at least a first element and a second element, each of the row keys comprising at least: a first portion comprising a first encoded value for the first element of a corresponding data item of the data records, a second portion comprising a second encoded value for the second element of the corre- (Continued)

sponding data item of the data records, storing the data records using the row keys, using a query processing module of the computer, receiving a search query comprising a first filter for the first element, translating the first filter into at least the first portion of a search key, and searching the dataset using the search key.

14 Claims, 4 Drawing Sheets

FIG. 1

Tenant Data Row Key { <Tenant ID>.<Date>.<Filter 1>.<Filter 2>
200

Benchmark Data Row Key { <Date>.<Filter 1>.<Filter 2>.<Filter 3>
205

Pre-computed Tenant Data Row Key { <Tenant ID>.<Date>.<Filter 1 Combination Bit String>.<Filter 2 Combination Bit String>
210

Pre-computed Benchmark Data Row Key { <Date>.<Filter 1>.<Filter 2>.<Filter 3 Combination Bit String>
215

DATABASE KEYING WITH ENCODED FILTER ATTRIBUTES

BENEFIT CLAIM

This application claims the benefit under 35 U.S.C. § 119 of India application 532/KOL/2015, filed May 15, 2015, the entire contents of which are hereby incorporated by reference for all purposes as if fully set forth herein.

TECHNICAL FIELD

The present disclosure generally relates to keying for a data store. The disclosure relates more specifically to techniques for efficiently storing and accessing large quantities of data in a data store through the use of encoding filter attributes as a portion of the key(s) used to organize/store data in the data store, typically as part of a multitenant Software as a Service (SAAS) environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The rise in hardware and software support costs has given way to a new technology delivery model in which an application service provider hosts applications coupled to data storage units on networked devices that are owned by the application service provider. The application service provider's customers, typically business enterprises, connect to the hosted applications via a web browser and enter data via the applications with the expectation that the data entered will be available on-demand whenever needed. The customers typically access the data for various data mining or data aggregation operations required to perform various analytics, such as determining particular trends related to their enterprise's operations. The application service provider rarely has advanced notice of when a customer may request access to its data; therefore, data entered by customers must be available at all times. Consequently, the application service provider must ensure that data entered by customers is always recorded and stored, and that customers may access that data, on-demand, for later consumption.

Another critical issue is the speed at which the customers may access their data, and perform the various analytics on their data—as well as any other data the customers may have access to, such as aggregated data to enable the customers to perform comparisons. In particular, slicing and dicing is a common way of analyzing the large volumes of data that may be involved. Slicing and dicing refers to a process of breaking down a large set of information into smaller pieces so that the smaller pieces may be analyzed. Slicing and dicing may involve, for example, filtering a dataset based on one or more elements and/or attributes.

The way in which data is stored within a data store, and subsequently searched, can have a large impact on the speed at which customers are able to access their data. Thus, improved methods of storing and/or searching data are always desired.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a method is described for database keying with encoded filter attributes. Specifically, row keys are generated for a columnar database. The row keys are based, in part, on values of elements stored in the data record accessed by the corresponding row key. In particular, the portions of the data record that form part of the row key are elements that may be used to filter and/or search the database by the users. In other words, the values for which users may filter and/or search the contents of the database form part of the key needed to access the data the users are searching for. Subsequently, when a search request is received from a tenant device with one or more filter selections, the filter selection(s) are translated into at least a portion of a search key for use in searching the database. The results of the search of the database may be sent to the tenant device for display. Optionally, in one embodiment, portions of the data may be pre-calculated, and the row keys may include a portion of a bit string to represent the selections of filters related to pre-calculated data.

In an embodiment, a method is described for database keying with encoded filter attributes. Specifically, electronic data stored in a columnar database may be accessed. A particular data record from the database may be read to determine a value of a first element and a second element. The values may then be encoded, and combined to generate a row key. The database may then be updated by associating the row key with the particular data record. The reading, determining, encoding, and generating steps may be repeated as necessary to reorganize at least a portion of the database. Subsequently, when a search request is received from a tenant device with one or more filter selections, the filter selection(s) are translated into at least a portion of a search key for use in searching the database. The results of the search of the database may be sent to the tenant device for display. Optionally, in one embodiment, portions of the data may be pre-calculated, and the row keys may include a portion of a bit string to represent the selections of filters related to pre-calculated data.

In other embodiments, the invention encompasses a computer apparatus and/or a computer-readable medium configured to carry out the foregoing methods.

Big Data Overview

Big Data is becoming an increasingly important aspect of all companies. The insights that can be gained by analyzing large quantities of data are invaluable. Many different methods, programs, and solutions have been developed. Apache HBase, developed by the Apache Software Foundation of Forest Hill, Md., is a non-relational distributed database capable of handling tremendous amounts of data in an efficient manner. While the invention is applicable to many other database applications and/or implementations, for the sake of clarity and conciseness, reference will be made primarily to HBase. Further, in the following description reference will be made to both data stores and databases. A data store is a repository for data. Similarly, a database is structured data store. A database may be structured in any suitable way, and should not be limited by the examples provided herein. Further, while reference may be made to either a data store or database, the invention is not limited to one or the other. In other words, when a database is used to describe one embodiment of the invention, a data store may also be used. Likewise, if a data store is used to describe another embodiment, a database may also be used.

While HBase is tremendously useful for storing large amounts of data, HBase is also difficult to understand, as the data model used by HBase is extremely different from the "standard" model used by "traditional" relational database management systems (RDBMS). An ever increasing amount of books, papers, presentations, and other information explaining all of the details about HBase and other similar databases are widely available. For the purposes of this invention, a few aspects of HBase need to be understood.

First, HBase may be used in conjunction with a multi-tenant service. Multitenancy refers to a single instance of software running on a server and servicing multiple tenants. For example, an HBase database may be used by many companies to store their compensation data. Each company retains full access to their own, private data, and may also gain access to aggregated, anonymized data from all other tenants. Alternatively, the aggregated data may not be anonymized. The aggregated data may be made available in many different ways, and may be used by each individual company as a benchmark for use in a variety of ways, such as determining whether their employees are properly compensated.

Second, row keys are highly important to the effectiveness of HBase. One description of HBase is a data store that stores columns of data against a row key, rather than rows as in the traditional model. Row keys are used organize, store, and access the stored data. Thus, the design of row keys is of critical importance—a poorly designed row key results in inefficient searches, stores, and other accesses of the data. Conversely, a well-designed row key results in faster searches, stores, and other accesses of the data. This is made all the more important because HBase does not natively support indexes as some other databases may. Optionally, external modules may be used to create a secondary index for HBase.

Lastly, data in HBase is stored within tables. There may be any number of tables within a given database, storing any suitable amount or type of data. As each table is separate from other tables, different types of data could be stored in different tables. Further, different configurations of row keys may be used for different tables. Alternatively, the same configurations of row keys may be used for different tables, or some combination of different and similar row keys may be used.

With these aspects of HBase in mind, the invention may be more clearly described. Additionally, throughout this detailed description, references will be made to compensation data as the type of data that is being stored. However, in no way is the invention limited to compensation data. Rather, any type of data is suitable for use with the present invention.

Example System Implementation

Figure 1:
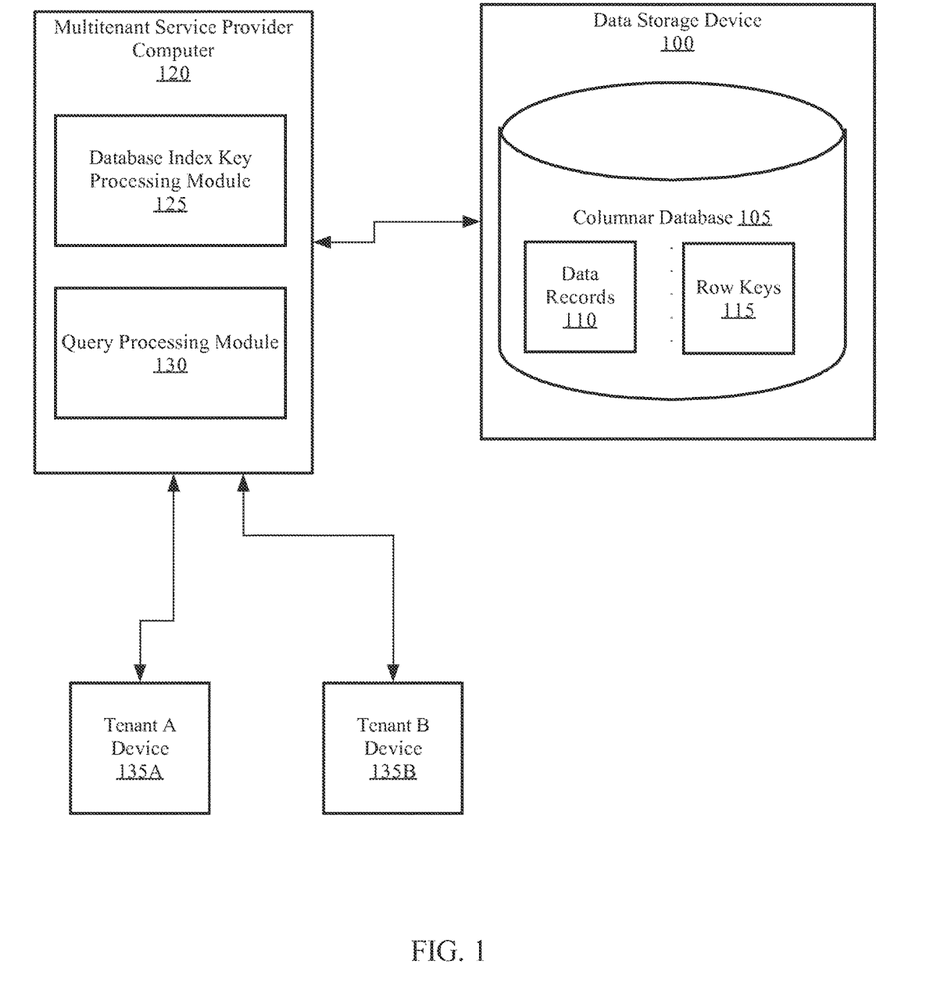
FIG. 1 shows a block diagram of a system in accordance with an embodiment of the invention.

FIG. 1 shows an example system in which the techniques described may be practiced, according to some embodiments. The system shown in FIG. 1 is a computer-based system. The various components of the system shown in FIG. 1 are implemented at least partially by hardware at one or more computing devices, such as one or more hardware processors executing instructions stored in one or more memories for performing various functions described herein. FIG. 1 illustrates only one of many possible arrangements of components configured to perform the functionality described herein. Other arrangements may include fewer or different components, and the division of work between the components may vary depending on the arrangement.

The system shown in FIG. 1 includes data storage device 100, columnar database 105, data records 110, row keys 115, multitenant service provider computer 120, database index key processing module (KPM) 125, query processing module 130, tenant A device 135A, and tenant B device 135B. Data storage device 100 may be any suitable storage device such as one or more hard disk drives, memories, or any other electronic digital data recording device configured to store data. Although data storage device 100 is depicted as a single device in FIG. 1, data storage device 100 may span multiple devices located in one or more physical locations. For example, data storage device 100 may be one or nodes located at a data warehouse(s). Additionally, in one embodiment, data storage device 100 may be located on the same device(s) as multitenant service provider computer 120. Alternatively, data storage device 100 may be located on a separate device(s) from multitenant service provider computer 120.

In one embodiment, data storage device 100 includes columnar database 105, data records 110, and row keys 115. Columnar database 105 is a database implemented using any suitable methodology, such as HBase. Columnar database 105 may be of any size, portioned into any number of tables or other units, and may be organized in any suitable way. Columnar database 105 stores data records 110. Depending on the intended use of columnar database 105, data records 110 may relate to any number of different tenants (such as tenant A of tenant A device 135A or tenant B of tenant B device 135B). Further, data records 110 may relate to any type data, such as personal information, business information, governmental data, compensation data, health data, environmental data, police/military data, etc. In one embodiment, portions of columnar database 105 may be precomputed for quicker access. The portions may be precomputed in any suitable manner.

In one embodiment, each data record is associated with a row key 115. Row keys 115 are used to uniquely identify and organize data records 110 within columnar database 105. Row keys 115 may be of any suitable length. In one embodiment, each row key 115 has a fixed length. Optionally, the length may be fixed on a table by table basis, with some tables having longer (or shorter) row keys 115 than others. Alternatively, all row keys within columnar database 105 may be of a consistent length. Row keys 115 will be discussed in more detail, below, with regards to FIG. 2 and KPM 125.

In one embodiment, multitenant service provider computer (120) is owned by, operated by, or associated with an application service provider that provides an online, real-time application program based upon SaaS environment that multiple tenants, such as tenant A of 135A and tenant B of 135B, access using client computers coupled over one or more networks to multitenant service provider computer 120. In an embodiment, each tenant comprises one or more computers (i.e., tenant A device 135A and/or tenant B device 135B) associated with a different business enterprise that has a customer relationship with the service provider that owns or operates the multitenant service provider computer 120. Multitenant service provider computer 120 is communicatively connected to data storage device 100, tenant A device 135A, and/or tenant B device 135B using any suitable wired and/or wireless connection.

In one embodiment, multitenant service provider computer 120 may provide any number of different applications to any number of tenants. Specifically, multitenant service provider computer 120 may provide one or more applications (not shown) that enable tenants to store and/or access data on data storage device 100. The application(s) may enable tenants to perform a variety of analyses on their data, as well as other's data, such as aggregated benchmark data. For example, the application may be a business application; an example is Xactly Insights, commercially available from Xactly Corporation, of San Jose, Calif. As part of the one or more applications, multitenant service provider computer 120 executes KPM 125 and query processing module 130. Alternatively, the functionalities described below with regards to database index key processing module 125 and query processing module 130 may be implemented on a device separate from multitenant service provider computer 120.

In one embodiment, KPM 125 includes functionality for identifying filterable elements for data records, defining and/or generating row keys 115 for storing data records 110 in columnar database 105, determining a one-to-one mapping for encoding filterable elements as a portion of row keys, and any other functionality needed to implement the invention. Specifically, the row keys KPM 125 defines and/or generates are based, at least in part, on attributes of the data that are available for use as a filter by a tenant searching the data. In one embodiment, KPM 125 defines and/or generates row keys on a table by table basis for columnar database 105. Alternatively, KPM 125 may define and/or generate row keys on any other suitable basis. The row keys defined and/or generated by KPM 125 are optimized to allow the data in the database to be accessed as quickly and efficiently as possible. In one embodiment, the row keys defined and/or generated by KPM 125 preclude the need to pre-compute results. Alternatively, in one embodiment, some results may be pre-computed. Thus, typically the row keys are organized in a form that most quickly excludes other data in the database. For example, if a database stores 100 records each for 5 different tenants, and each of the 500 records correspond to the same exact date, then the row key should begin with a value that unique identifies a tenant, rather than a value that identifies the date. This is because filtering by a single tenant first requires only up to 100 records to be accessed, in contrast to all 500 for filtering by date first.

Figure 2:
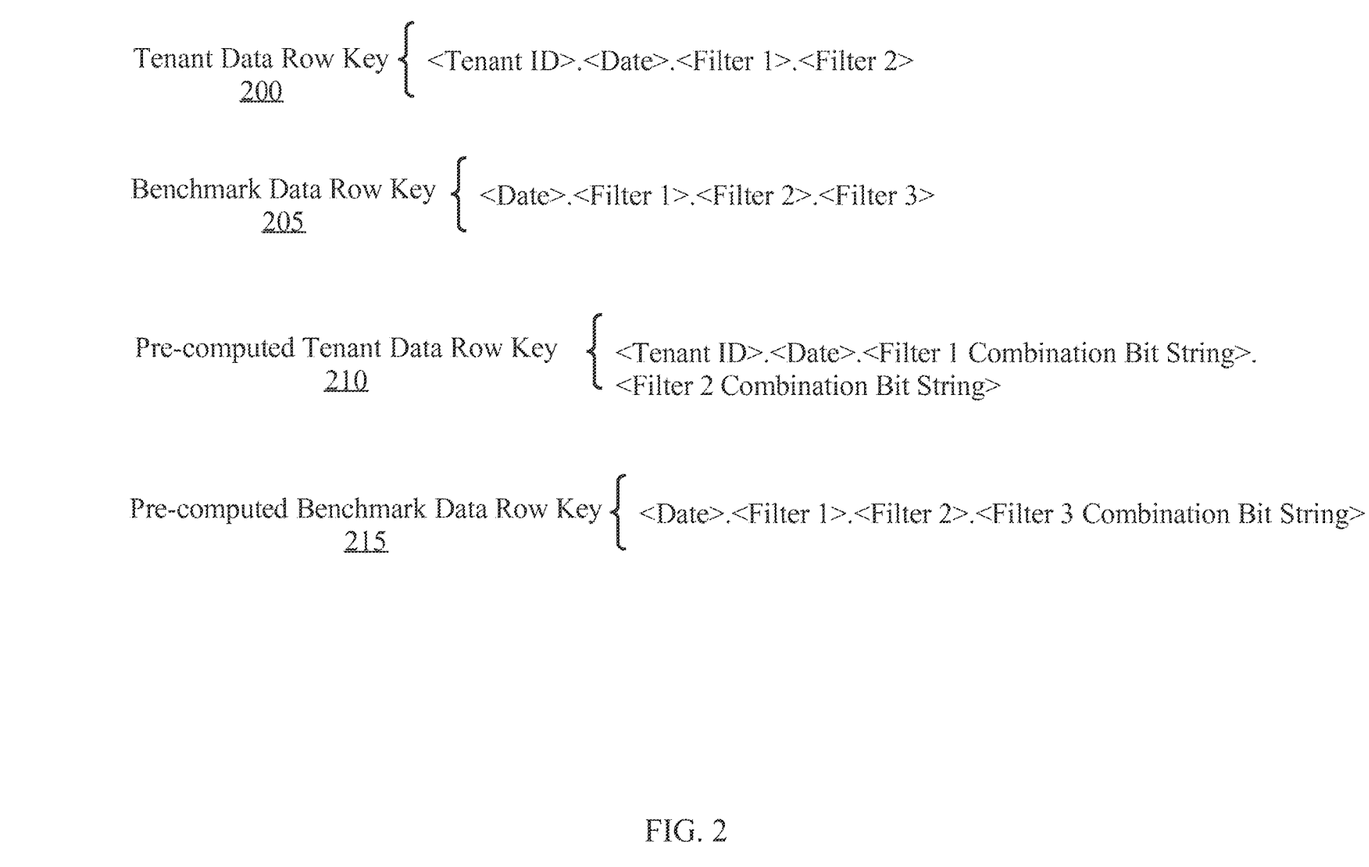
FIG. 2 shows row key designs in accordance with an embodiment of the invention.

In one embodiment, the potential values of filterable elements are pre-defined, and KPM 125 maintains a one-to-one mapping of the values of filterable elements to an encoded version for use in row keys. In one embodiment, KPM 125 supports four different kinds of row keys, as shown in FIG. 2: tenant data row key 200 is for a data specific to a single tenant, benchmark data row key 205 is for data used by one or more tenants for benchmarking purposes, pre-computed tenant data row key 210 is for a data that include at least a portion of pre-computed aggregated data and is specific to a single tenant, and pre-computed benchmark data row key 215 is for a data that includes at least a portion of pre-computed aggregated data that is used by one or more tenants for benchmarking purposes. KPM 125 supports any number of different kinds of row keys. Further, in one embodiment, a single data table may contain only one kind of row key and/or be specific to a single tenant. Alternatively, a single data table may contain multiple kinds of row keys and/or include tenant-specific data of two or more separate tenants.

In one embodiment, query processing module 130 includes functionality for processing queries of tenants, such as tenant A device 135A and/or tenant B device 135B. Queries may be processed in any suitable method. In one embodiment, query processing module 130 takes the inputs received from tenants, and translates the queries encoding a portion into one or more search keys for retrieving data from the database(s). The inputs may be received in any suitable manner. In one embodiment, the inputs may be received through a web browser, or other application. The inputs may include, for example, selections of filterable elements for searching the database. The inputs may take any form. For example, the web browser may present the tenant with one or more drop down boxes, check boxes, or other selectable items to indicate what data the tenant would like to access. Query processing module 130 may then process, by encoding, the inputs to generate a search key for searching the database. In one embodiment, query processing module 130 may utilize the one-to-one mapping generated by KPM 125 to generate a search key from the inputs received from the tenants. In one embodiment, query processing module 130 includes functionality to send the results of searching the database using the search key to the requesting tenant in any suitable manner.

In one embodiment, tenant A device 135A and tenant B device 135B are one or more computing devices, including, but not limited to: work stations, personal computers, general purpose computers, laptops, Internet appliances, handheld devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Tenant A device 135A and tenant B device 135B may include applications, software, and/or other executable instructions to facilitate various aspects of the invention described herein. Specifically, tenant A device 135A and tenant B device 135B are able to display results of accessing columnar database 105, provide input for searching columnar database 105, and or any other functionalities needed by the present invention. In one embodiment, there may be any number of tenant devices, and each unique tenant may include one or more devices.

Example Generic Row Key Specifications

Turning to FIG. 2, tenant data row key 200 shows a generic form of a row key for use with data specific to a single tenant. This data may be, for example, private data generated during the course of the tenant's business, such as compensation information for each of the tenant's employees. Tenant data row key 200 shows four parts, although there may be fewer, or more, parts than as shown in FIG. 2. Specifically, tenant data row key 200 begins with a tenant ID. The tenant ID uniquely identifies the tenant. This ID may be a name, number, or other suitable identification. The tenant ID may be encoded in the row key in a form suitable for a row key. For example, for "Company A" the tenant ID in encoded row key form may be "000061." In one embodiment, the tenant ID is a string of length 6. Alternatively, the tenant ID may be of any other suitable format and/or length. In one embodiment, the tenant ID may not be a filterable element when using the database. In other words, a tenant may not be able to select a specific tenant ID for searching and/or entering data. Rather, the tenant ID may be bound to the corresponding tenant's devices using any suitable method, to prevent tenants from accessing the private data of other tenants. Alternatively, the tenant ID may be a filterable and/or selectable element by a tenant when accessing the database.

Continuing with tenant data row key 200, the second part of the row key is a date. The date may correspond to the date that the data relates to, such as a given day, week, month, year, etc. Alternatively, the date may correspond to a timestamp associated with when the data was entered into the database, or any other suitable time. In one embodiment, the date may be encoded in "YYYYMM" format. Thus, a date of May 2014, would be encoded for use in a row key as 201405. Alternatively, other suitable formats of dates may be used. In one embodiment, the date is a filterable element when using the database.

Continuing with tenant data row key 200, the third and fourth parts of the key are Filter 1 and Filter 2. Filter 1 and Filter 2 refer to attributes of the data records that are filterable and/or selectable by a tenant(s) when searching or otherwise accessing the database. Each of the filters may be encoded into a form for use in a row key in any suitable manner. For example, the filters shown in tenant data row key 200 may correspond to an encoded value for a job title and a hierarchy. Thus, the for the job title "assistant" might be encoded as "005" and the hierarchy identifying "manager A" might be encoded as "003." Thus, using the examples given when describing tenant data row key 200, above, the corresponding row key is "0000612014050005003." Optionally, there may be symbols or other means of delineating one portion of a row key from another, such as periods, dashes, etc. Additionally, there may be padding on the beginning or ending of row keys, to allow for addition of more filterable data elements, etc. Although shown in FIG. 2 as containing Filter 1 and Filter 2, there may be any number of filterable elements for a given data record(s), and they may correspond to any type of information. Further, each available filterable data element need not be included in a row key—a subset of the filterable data elements may be used for the row key(s). In one embodiment, Filter 1 and Filter 2 each have a fixed length of three bytes. Alternatively, the length may be longer or shorter. Regardless of the number of filters included in a row key, each individual filter may have the same fixed length. Alternatively, individual filters may have different lengths, or some combination of the same and different lengths.

In one embodiment, benchmark data row key 205 shows a generic form of a row key for use with benchmarking data available to one or more tenants. Benchmarking data is data representative of multiple different tenants that may be used to perform comparisons and/or other analytics. In one embodiment, the benchmarking data has been anonymized to some extent. Alternatively, the benchmarking data may not have been anonymized. Benchmark data row key 205 begins with a date. The date may include any of the same aspects and/or functionalities as the date described above when discussing tenant data row key 200. The remaining elements of benchmark data row key 205 are filterable elements Filter 1, Filter 2, and Filter 3. Although benchmark data row key 205 shows three filters, there may be any suitable number of filterable elements used in benchmark data row key 205. For example, in a compensation context, the filterable elements in benchmarking may be: industry, role, hierarchy, company ownership type, and/or revenue group, each of which may appear in a benchmark data row key in a suitable encoded form. Alternatively, only a subset, such as industry, role, and company ownership type, may appear in a benchmark data row key. Each of Filter 1, Filter 2, and Filter 3 of benchmark data row key 205 may have a fixed length, such as three bytes. Alternatively, any other suitable fixed length may be used.

In one embodiment, some data tables or other sets of data may be of such a substantial size, that even with efficient design of row keys the process of accessing the database is not fast enough. This may impact performance of applications, and is typically highly visible from the perspective of a tenant. Thus, additional methods are needed when dealing with very large sets of data. Pre-computing is one such method. When the data to be accessed is precomputed and stored in a summarized or pre-aggregated fashion for access by the tenants, the response times may drastically improve. Pre-computed tenant data row key 210 and pre-computed benchmark data row key 215 are row keys for such tables/data sets.

In one embodiment, pre-computed tenant data row key 210 shows a generic form of a row key for use with pre-computed data relating to, and accessible by, a specific tenant. Pre-computed tenant data row key 210 begins with a tenant ID. The tenant ID may include any of the same aspects and/or functionalities of the tenant ID as described above when discussing tenant data row key 200. Next, the pre-computed tenant data row key 210 includes a date. The date may include any of the same aspects and/or functionalities of the date as described above when discussing tenant data row key 200.

In one embodiment, pre-computed tenant data row key 210 includes Filter 1 combination bit string and Filter 2 combination bit string. These combination bit strings are represented as a bit string of zeros and ones, each with a length equal to the number of filter values. Thus, if Filter 1 (e.g., job title, etc.) has three potential values (e.g., assistant, manager, vice president, etc.), then the bit string will have a length of three. In one embodiment, each filter combination may have a different length. Alternatively, each filter combination may have the same length or some combination of the same and different lengths. In one embodiment, additional unused bits may be added to the beginning or end of a filter combination bit string, to enable later addition of filter selections. In one embodiment, each position in a filter combination bit string corresponds to a specific filter value, with a "0" indicating the filter was not selected, and a "1" indicating that the filter was selected. Thus, using the example of job titles, with "assistant" corresponding to the first position in the bit string, "manager" corresponding to the second position in the bit string, and "vice president" corresponding to the third position in the bit string, the bit string "101" would indicate that assistant and vice president have been selected. An example of data that may need to use the row key format of pre-computed tenant data row key 210, in the context of compensation, is credit data. Credit data describes which salesperson(s) receive credit for a given sale. An example row key for credit data may include, for example, a tenant ID, a date, a job title combination bit string, and a hierarchy combination bit string. Alternatively, any number of elements may be included in a row key for credit data.

In one embodiment, pre-computed benchmark data row key 215 shows a generic form of a row key for use with pre-computed benchmarking data available to one or more tenants. Benchmarking data is data representative of multiple different tenants that may be used to perform comparisons and/or other analytics. In one embodiment, the benchmarking data has been anonymized to some extent. Alternatively, the benchmarking data may not have been anonymized. Pre-computed benchmark data row key 215 begins with a date. The date may include any of the same aspects and/or functionalities as the date described above when discussing tenant data row key 200. The next elements of benchmark data row key 205 are filterable elements Filter 1 and Filter 2. These filterable elements may be any suitable element. Particularly, unlike the next element in pre-computed benchmark data row key 215, Filter 1 and Filter 2 are not pre-computed filter combinations. Filter 1 and Filter 2 may include any of the aspects and/or functionalities as described above for Filter 1 and Filter 2 when discussing benchmark data row key 205. Although pre-computed benchmark data row key 215 shows two filters, there may be any suitable number of filterable elements used in pre-computed benchmark data row key 215.

In one embodiment, the next element of pre-computed benchmark data row key 215 is a Filter 3 combination bit string. As discussed previously, combination bit strings are represented as a bit string of zeros and ones, each with a length equal to the number of filter values. Thus, if Filter 3 has 10 potential values, then the bit string will have a length of 10. In one embodiment, each filter combination may have a different length. Alternatively, each filter combination may have the same length or some combination of the same and different lengths. In one embodiment, additional unused bits may be added to the beginning or end of a filter combination bit string, to enable later addition of filter selections. In one embodiment, each position in a filter combination bit string corresponds to a specific filter value, with a "0" indicating the filter was not selected, and a "1" indicating that the filter was selected.

In one embodiment, pre-computed benchmark data row key 215 may have any combination of any numbers of filters and combination bit strings included in the row key. Specifically, in the compensation context, the filterable elements may include an industry ID, a payees size, a company ownership type, a revenue group ID, a role combination bit string, a hierarchy combination bit string, and a credit type combination bit string.

Although not shown in FIG. 2, additional generic forms of keys exist. For example, keys relating to ad serving applications and marketing analytics may follow the above generic key forms exactly, even though the type of data filtered is different. Alternatively, the keys may differ slightly. In the ad serving context, a key design may be very similar to benchmark data row key 205. As one example, a key for searching banner ads shown on a given day may begin with a date relating to the date that the ad was shown, and may be formatted as discussed above, or in any other manner. The rest of the key may be various filterable elements. For example, the first filterable element may be a geo ID that relates to a region or location code on which the ad campaign is scheduled to run. Each region or location code may be encoded, such that any region is identifiable by a three digit code.

In one embodiment, another filterable element may be demographics, which relates to the demographics of the target audience, such as age groups, income, etc. In one embodiment, demographics may appear multiple times in the key, one for each type of filter, as there are many potential ways of identifying and/or filtering an audience based on demographic data. For example, age range(s) may be a separate portion of the key from average income. Alternatively, there may be a single portion of the key for demographics even though multiple different demographic characteristics may be filterable, with each combination (e.g., 28-35 and income over $75 k, etc.) encoded into a unique combination for use in the key. Another filterable element for a key for searching banner ads shown on a particular day may be a campaign ID for identifying a given ad campaign. Likewise, another filterable element may be the campaign banner links, which relate to specific ad banners of the campaign.

In one embodiment, a key for an ad serving application may be very similar to pre-computed tenant data row key 210. The ad serving key may begin with an advertiser ID, uniquely identifying an advertiser. Subsequently, any number of filter combination bit strings may follow. For example, a first filter combination bit string may relate to various selectable age groups for demographics (e.g., 1-10, 11-10, 21-30, etc.), with each age group being represented by a single bit. A second filter combination bit string may relate to various selectable incomes, with each income range being represented by a single bit. Optionally, a date or other elements may also be included in the key.

In one embodiment, in the marketing analytics context, a marketing key for storing revenue generation information may begin with a channel ID and/or a campaign ID. A channel ID may identify the channel on which the marketing campaign is running, such as TV, website, radio, etc. A campaign ID identifies a specific campaign. The marketing key may also include a date, and a variety of filterable elements, such as a lead ID for identifying a lead, and revenue generated, for how much revenue was generated. While a few examples have been discussed above, the invention is applicable to any type of data in any context, and should not be limited to the above examples.

Example Functional Implementation

Figure 3:
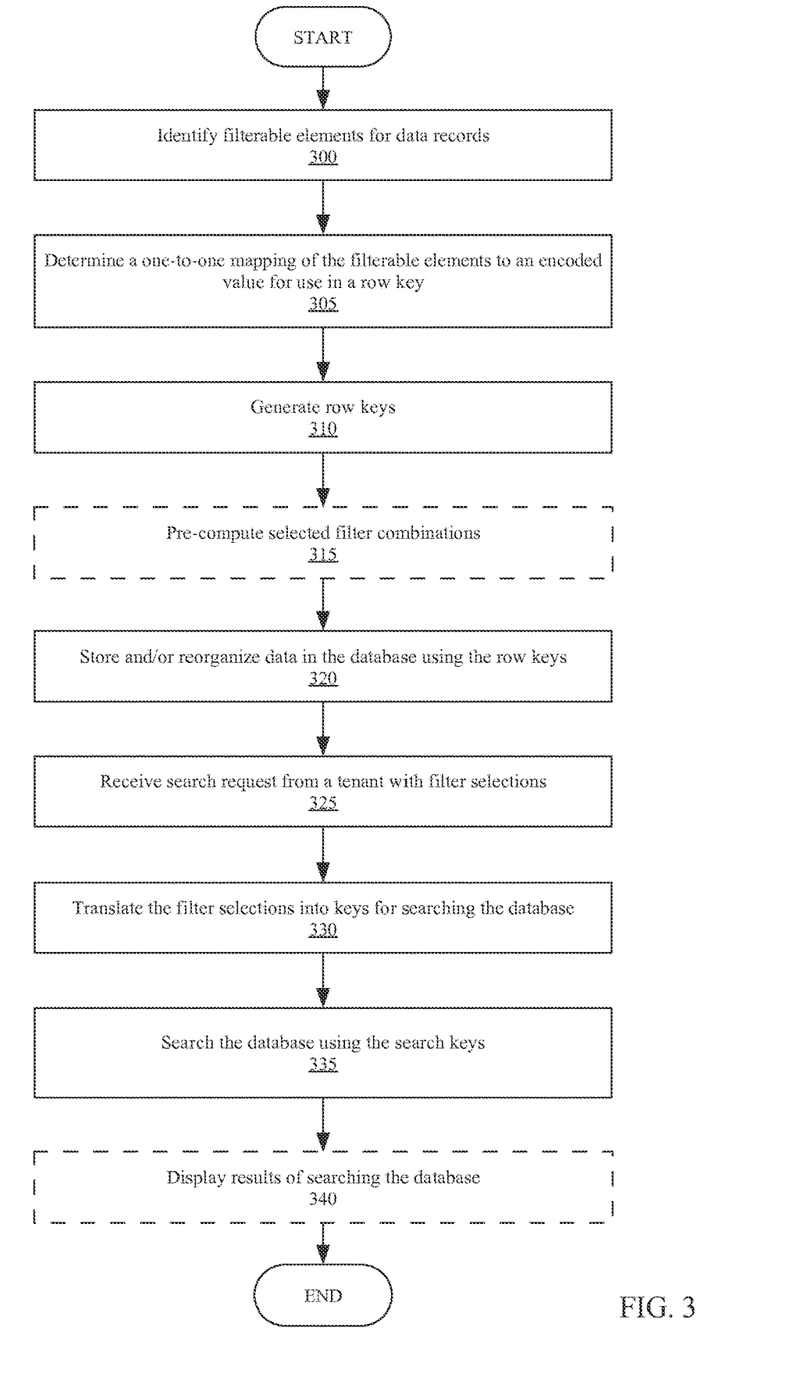
FIG. 3 shows a flowchart of a method in accordance with an embodiment of the invention.

FIG. 3 shows an example flowchart of a method for database keying with encoded filter attributes. Although the steps in FIG. 3 are shown in an order, the steps of FIG. 3 may be performed in any order, and are not limited to the order shown in FIG. 3. Additionally, some steps may be optional, may be performed multiple times, and/or may be performed by different components.

In step 300, filterable elements for data records are identified. The filterable elements may be identified in advance of receiving any data records, or after receiving data records, and may be identified in any suitable manner. The filterable elements may be any elements. Example filterable elements within the context of compensation analysis include, but are not limited to: job title, salary, hierarchy, industry ID, revenue group ID, company ownership ID, payees size, etc. In the context of ad serving applications, the filterable elements may include, but are not limited to: a region or location code on which an ad campaign is scheduled to run, demographics of the target audience, campaign ID, banner links, date, etc. As another example, filterable elements in the context of marking analytics may include, but are not limited to: channel ID, campaign ID, date, lead ID, revenue generated, etc.

In step 305, a one-to-one mapping of the filterable elements to an encoded value for use in a row key is determined. The one-to-one mapping may be generated in any suitable manner. The encoded values may be any values. In one embodiment, the encoded values may be a string or strings of a fixed length, such as 3 or 6 bytes, or any other length. Alternatively, the encoding may be a bit string, or any other format for use in a row key. In one embodiment, the one-to-one mapping is possible because there are a pre-defined number of values for the filterable elements, and the number of values may be determined and/or is known in advance.

In step 310, row keys are generated. The row keys may be generated in any suitable manner. The row keys may be generated using a different format for different data tables and/or data sets. In one embodiment, the row keys have a uniform length, regardless of what data table they were generated for. Alternatively, the length of the row key may vary.

In step 315, selected filter combinations are pre-computed. As indicated by the dotted line, step 315 is optional. Step 315 may only be performed when the size of the data set is too large to enable rapid slicing and dicing without precomputing at least portions of the data set. Any suitable amount of filter combinations for the data set may be pre-computed.

In step 320, data in the database is stored and/or reorganized using the row keys. The data may be stored and/or reorganized in any suitable manner, across any number of nodes, tables, etc.

In step 325, a search request from a tenant is received with filter selections. The search request may be received in any suitable manner. In one embodiment, the search request may be received from a tenant device via an application, such as a web browser or a specialized software application. The search request may take any suitable form. In one embodiment, the search request includes filter selections indicating what data the tenant would like to view and/or analyze.

In step 330, the filter selections are translated into search keys for searching the database. The filter selection may be translated in any suitable manner, such as utilizing the one-to-one mapping determined in step 305.

In step 335, the database is searched using the search keys. The database may be searched in any suitable manner. In one embodiment, portions of the search key may be masked. The search results may be sent to the tenant device(s) in any manner.

In step 340, results of searching the database are displayed. As indicated by the dotted line, the results of searching the database may be displayed on a tenant device. The results may be displayed in any format such as a graph, chart, list, etc.

Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
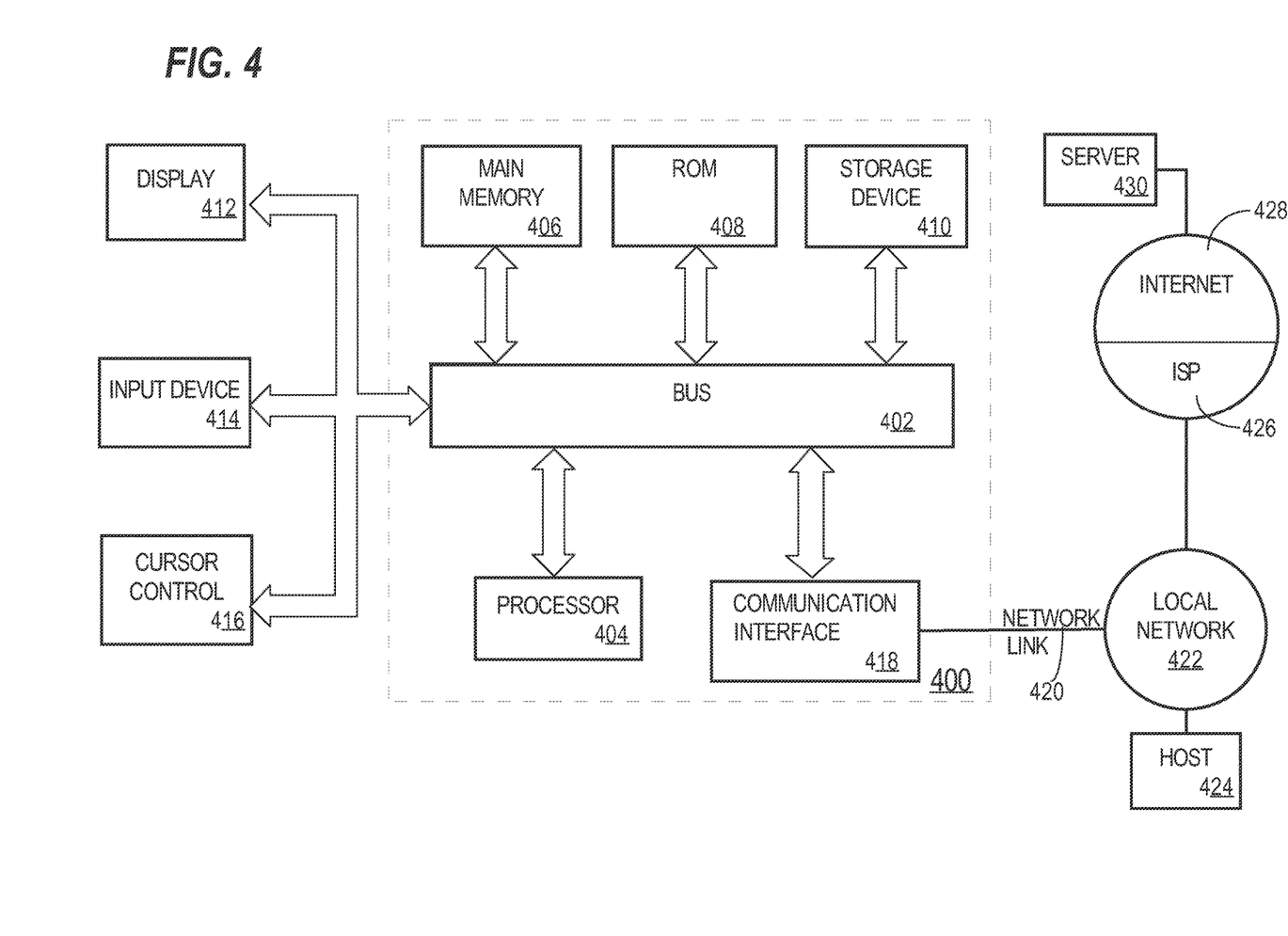
FIG. 4 shows a block diagram of a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled to bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Other Aspects of Disclosure

The disclosure also includes the subject matter of the following numbered clauses:

28. A computer system comprising: a multitenant service provider computer coupled to a data storage device, the multitenant service provider computer programmed to perform: using a database index key processing module in the multitenant service provider computer, accessing a plurality of electronically stored digital data records of a columnar database that is managed in the data storage device that is communicatively accessible to the multitenant service provider computer, wherein each of the data records comprises at least a first data element and a second data element; electronically reading a particular data record from the columnar database; based upon the particular data record, generating a first row key portion comprising a first encoded value for a particular first element of a data item of the particular data record, wherein the first row key portion has a fixed byte length; based upon the particular data record, generating a second row key portion comprising a second encoded value for a particular second element of the data item, wherein the second portion has the fixed byte length; generating a row key for the particular data record by combining the first row key portion and the second row key portion; updating the particular data record in the columnar database by associating the row key with the particular data record; repeating the reading, generating and updating steps for at least a subset of all the data records in the columnar database; using a query processing module of the service provider computer, receiving a search query from a tenant device comprising a first filter for a first element of the data records, translating the first filter into at least a portion of a search key, and searching the dataset using the search key.

29. The computer system of claim 28, wherein the first filter is selected from a first plurality of pre-defined filters for the first element.

30. The computer system of claim 29, further comprising: aggregating a portion of the columnar database based on precomputing one or more filter combinations, wherein the one or more combinations of filters are selected from the group consisting of the first plurality of pre-defined filters for the first element and a second plurality of pre-defined filters for the second element.

31. The computer system of claim 30, wherein the one or more filter combinations are represented as a binary bit string.

32. The computer system of claim 28, wherein the plurality of data records comprise data relating to one or more of compensation data, marketing data, and ad serving data.

33. A data processing method comprising: using a database index key processing module in a computer, generating a plurality of row keys for a data store that is managed in a data storage device that is communicatively accessible to the computer, the data store comprising a plurality of data records, each of the data records comprising at least a first element and a second element; each of the plurality of row keys comprising at least: a first portion comprising a first encoded value for the first element of a corresponding data item of the plurality of data records, wherein the first portion has a fixed byte length; a second portion comprising a second encoded value for the second element of the corresponding data item of the plurality of data records, wherein the second portion has the fixed byte length; using the computer and the data store, storing the plurality of data records using the plurality of row keys; using a query processing module of the computer, receiving a search query from a client device comprising a first filter for the first element, translating the first filter into at least the first portion of a search key, and searching the dataset using the search key; wherein the method is performed using one or more computing devices.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:

using a database index key processing module in a multitenant service provider computer, generating a plurality of row keys for a table of a columnar database that is managed in a data storage device that is communicatively accessible to the multitenant service provider computer, the columnar database comprising a plurality of data records, each of the data records comprising at least a first element and a second element;

each of the plurality of row keys comprising at least: a binary bit string having a length greater than or equal to a number of possible values for the first element, wherein each bit of the binary bit string corresponds to a specific value of the possible values and indicates whether the specific value is included in a data record associated with the row key;

at least one of the plurality of row keys including a binary bit string that is a filter combination binary bit string having bits indicating that at least two values for the first element are included in the data record associated with the row key;

using the multitenant service provider computer and the columnar database, storing the data records in the table using the plurality of row keys;

using a query processing module of the multitenant service provider computer, receiving a search query from a client device comprising a selection of the at least two values for the first element, translating the at least two values into at least a first portion of a search key corresponding to the filter combination binary bit string, and searching the table using the search key to generate search results;

sending the search results to the client device, wherein the search results are displayed on the client device;

wherein the method is performed using one or more computing devices.

2. The data processing method of claim 1, further comprising masking a part of the search key.

3. The data processing method of claim 1 further comprising: generating a one-to-one mapping for encoding each of the possible values for the first element.

4. The data processing method of claim 1, wherein each of the plurality of row keys further comprises a third portion comprising a date encoded as a string.

5. The data processing method of claim 4, wherein the string comprises six digits.

6. The data processing method of claim 1, wherein the plurality of data records comprise data relating to one or more of compensation data, marketing data, and ad serving data.

7. A data processing method comprising:

using a database index key processing module in a multitenant service provider computer, accessing a plurality of electronically stored digital data records of a columnar database that is managed in a data storage device that is communicatively accessible to the multitenant service provider computer, wherein each of the data records comprises at least a first data element and a second data element;

electronically reading a particular data record from the columnar database;

based upon the particular data record, generating a first row key portion comprising a first encoded value for a particular first element of a data item of the particular data record, wherein the first row key portion has a fixed byte length;

based upon the particular data record, generating a second row key portion comprising a second encoded value for a particular second element of the data item, wherein the second row key portion has the fixed byte length;

generating a row key for the particular data record by combining the first row key portion and the second row key portion;

updating the particular data record in the columnar database by associating the row key with the particular data record;

repeating the reading, generating, and updating steps for at least a subset of all the data records in the columnar database;

updating a table of the columnar database that stores data records based on at least the subset of all the data records by generating a row key for each of the data records, each row key comprising at least a binary bit string having a length greater than or equal to a number of possible values for the first element, wherein each bit of the binary bit string corresponds to a specific value of the possible values and indicates whether the specific value is included in a data record associated with the row key;

at least one of the row keys including a binary bit string that is a filter combination binary bit string having bits indicating that at least two values for the first element are included in the data record associated with the row key;

using the multitenant service provider computer and the columnar database, storing the data records in the table using the row keys;

using a query processing module of the service provider computer, receiving a search query from a tenant device comprising a selection of the at least two values for the first element, translating the at least two values into at least a portion of a search key corresponding to the filter combination binary bit string, and searching the table using the search key to generate search results; and sending the search results to the client device, wherein the search results are displayed on the client device.

8. The data processing method of claim 7, further comprising masking a part of the search key.

9. The data processing method of claim 7 further comprising: generating a one-to-one mapping for encoding each of the possible values for the first element.

10. The data processing method of claim 7, wherein each of the plurality of row keys further comprises a third portion comprising a date encoded as a string.

11. The data processing method of claim 10, wherein the string comprises six digits.

12. The data processing method of claim 7, wherein the plurality of data records comprise data relating to one or more of compensation data, marketing data, and ad serving data.

13. A computer system comprising:

a multitenant service provider computer coupled to a data storage device, the multitenant service provider computer programmed to perform:

using a database index key processing module in the multitenant service provider computer, generating a plurality of row keys for a table of a columnar database that is managed in the data storage device that is communicatively accessible to the multitenant service provider computer, the columnar database comprising a plurality of data records, each of the data records comprising at least a first element and a second element;

each of the plurality of row keys comprising at least: a binary bit string having a length greater than or equal to a number of possible values for the first element, wherein each bit of the binary bit string corresponds to a specific value of the possible values and indicates whether the specific value is included in a data record associated with the row key;

at least one of the plurality of row keys including a binary bit string that is a filter combination binary bit string having bits indicating that at least two values for the first element are included in the data record associated with the row key;

using the multitenant service provider computer and the columnar database, storing the data records in the table using the plurality of row keys;

using a query processing module of the multitenant service provider computer, receiving a search query from a client device comprising a selection of the at least two values for the first element, translating the at least two values into at least a first portion of a search key corresponding to the filter combination binary bit string, and searching the table using the search key to generate search results;

sending the search results to the client device, wherein the search results are displayed on the client device.

14. The computer system of claim 13, wherein the plurality of data records comprise data relating to one or more of compensation data, marketing data, and ad serving data.

* * * * *